(12) United States Patent
Xu (10) Patent No.: US 9,129,374 B2
(45) Date of Patent: Sep. 8, 2015

(54) IMAGE SHARPENING METHOD AND DEVICE

(71) Applicant: Huawei Technologies Co., LTD, Shenzhen (CN)

(72) Inventor: Xianxiang Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 124 days.

(21) Appl. No.: 13/931,849

(22) Filed: Jun. 29, 2013

(65) Prior Publication Data

US 2014/0010472 A1    Jan. 9, 2014

(30) Foreign Application Priority Data

Jun. 30, 2012    (CN) .......................... 2012 1 0222872

(51) Int. Cl.
*G06K 9/40*    (2006.01)
*G06T 5/00*    (2006.01)

(52) U.S. Cl.
CPC ....... *G06T 5/003* (2013.01); *G06T 2207/20028* (2013.01); *G06T 2207/20192* (2013.01)

(58) Field of Classification Search
None
See application file for complete search history.

(56) References Cited

U.S. PATENT DOCUMENTS

| 2004/0136570 | A1* | 7/2004 | Ullman et al. | 382/114 |
| 2009/0040376 | A1* | 2/2009 | Kobayashi | 348/452 |
| 2010/0066874 | A1* | 3/2010 | Ishiga | 348/252 |

* cited by examiner

*Primary Examiner* — Chan Park
*Assistant Examiner* — Mai Tran
(74) *Attorney, Agent, or Firm* — Slater & Matsil, L.L.P.

(57) ABSTRACT

Embodiments of the present invention provide an image sharpening method and device. The method includes performing bilateral filtering processing and difference of Gaussians filtering processing on original image information to obtain first image-layer information and second image-layer information respectively. The first image-layer information is subtracted from the original image information to obtain third image-layer information. Fusion and superimposition processing is performed on the second image-layer information and the third image-layer information to obtain fourth image-layer information. The original image information and the fourth image information are added to obtain processed image information.

15 Claims, 4 Drawing Sheets

---

Performing bilateral filtering processing and difference of Gaussians filtering processing on original image information to obtain first image-layer information and second image-layer information respectively — 101

Subtract the first image-layer information from the original image information to obtain third image-layer information — 102

Perform fusion and superimposition processing on the second image-layer information and the third image-layer information to obtain fourth image-layer information — 103

Add the original image information and the fourth image-layer information to obtain processed image information — 104

IMAGE SHARPENING METHOD AND DEVICE

CROSS-REFERENCE TO RELATED APPLICATIONS

This application claims priority to Chinese Patent Application No. 201210222872.3, filed on Jun. 30, 2012, which is hereby incorporated by reference in its entirety.

TECHNICAL FIELD

The present invention relates to image processing technologies, and in particular, to an image sharpening method and device.

BACKGROUND

A hardware problem of a photographing device or processing through some image algorithms (for example, an image smoothing algorithm) tends to blur a border or an outline in an image. Image sharpening is a method for compensating an outline of an image and enhancing an edge and a gray level jump part of the image, so as to make the image clear. In view of a frequency domain, an image is blurred because its high-frequency component is attenuated. Therefore, an idea of the image sharpening is that a high-pass filter is mainly used to extract high-frequency information from an image and the extracted high-frequency information is superimposed on the original image to make the image clear.

Currently, in a commonly used image sharpening method, a high-pass filter, that is, a Laplacian, is used to perform a Laplacian operation on a luminance component of an image to obtain its high-frequency information, for example, edge information and outline information of the image, and corresponding pixels of the original image and an image that has undergone the Laplacian operation are directly added up, so as to achieve an objective of enhancing an edge and an outline of the image and making the image look clearer. However, in this method, after the image that has undergone the Laplacian operation is superimposed on the original image, overshoot and undershoot tend to occur at a bright-dark boundary. Such phenomena are manifested in the image as a "white margin" and a "black margin" that are produced at a black-white edge. That is, a halo (halo) effect occurs, and a sharpening effect of the image is relatively poor.

SUMMARY

Embodiments of the present invention provide an image sharpening method and device, so as to reduce a halo effect caused by image sharpening and improve an image sharpening effect.

In one aspect, an image sharpening method is provided and includes:

performing bilateral filtering processing and difference of Gaussians filtering processing on original image information to obtain first image-layer information and second image-layer information respectively;

subtracting the first image-layer information from the original image information to obtain third image-layer information;

performing fusion and superimposition processing on the second image-layer information and the third image-layer information to obtain fourth image-layer information; and adding the original image information and the fourth image-layer information to obtain processed image information.

In another aspect, an image sharpening device is provided and includes:

a first filtering module, configured to perform bilateral filtering processing on original image information to obtain first image-layer information;

a second filtering module, configured to perform difference of Gaussians filtering processing on the original image information to obtain second image-layer information;

a first processing module, configured to subtract the first image-layer information from the original image information to obtain third image-layer information;

a second processing module, configured to perform fusion and superimposition processing on the second image-layer information and the third image-layer information to obtain fourth image-layer information; and a third processing module, configured to add the original image information and the fourth image-layer information to obtain processed image information.

With the image sharpening method and device provided in the embodiments of the present invention, bilateral filtering processing is performed on original image information, and first image-layer information obtained through bilateral filtering processing is subtracted from the original image information to obtain third image-layer information. In addition, difference of Gaussians filtering processing is performed on the original image information to obtain second image-layer information. By using different manifestations of the third image-layer information and the second image-layer information at a position of a high-contrast edge, the third image-layer information and the second image-layer information are fused and superimposed. Then, fourth image-layer information obtained through the fusion and superimposition and the original image information are added to obtain processed image information. Therefore, image sharpening is implemented, characteristics of bilateral filtering and difference of Gaussians filtering are fully utilized, and beneficial effects of the two are well combined, thereby alleviating or even eliminating a halo effect caused by image sharpening, and improving an image sharpening effect.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention more comprehensible, the following clearly and describes the technical solutions in the embodiments of the present invention with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

Figure 1:
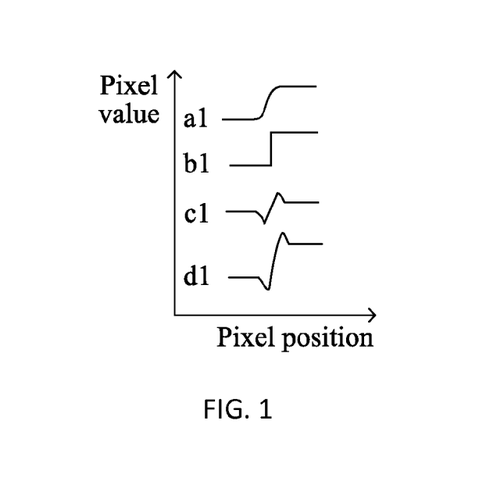
FIG. 1 is a schematic diagram of one-dimensional section curves of high-frequency information in an image sharpening process when image sharpening is performed by using a Laplacian in the prior art.

In the prior art, a high-pass filter, that is, a Laplacian, is used to perform image sharpening, and an image sharpening effect is shown in FIG. 1. In FIG. 1, a horizontal coordinate represents a pixel position at an edge in an image, and a vertical coordinate represents a gray-scale value that is corresponding to the pixel position at the edge in the image. As shown in FIG. 1, a curve a1 is a one-dimensional section of high-frequency information (for example, information about an edge outline part) in an original image, and its gray scale slowly changes from dark to bright, which causes a visual blur in the image. A curve b1 is a one-dimensional section of ideal sharpened high-frequency information, its gray scale changes rapidly, which makes the image visually clear. When a Laplacian is used to perform image sharpening, a light-gray margin line is extracted from the high-frequency information shown by the curve a1, where its one-dimensional section is shown as a curve c1, and a one-dimensional section of high-frequency information that is obtained after an image processed by using the Laplacian is superimposed on the original image is shown as a curve d1. It can be seen from the curve d1 that, for the high-frequency information that is obtained after the image processed by using the Laplacian is superimposed on the original image, overshoot and undershoot are likely to occur at a bright-dark boundary, which is deviated from the ideal sharpened high-frequency information shown by the curve b1. Such phenomena are manifested in the image as a "white margin" and a "black margin" artificially caused at a black-white edge, that is, a halo effect, which results in a relatively poor image sharpening effect. Based on this, the following embodiment of the present invention provides an image sharpening method to solve the foregoing problem.

Figure 2A:
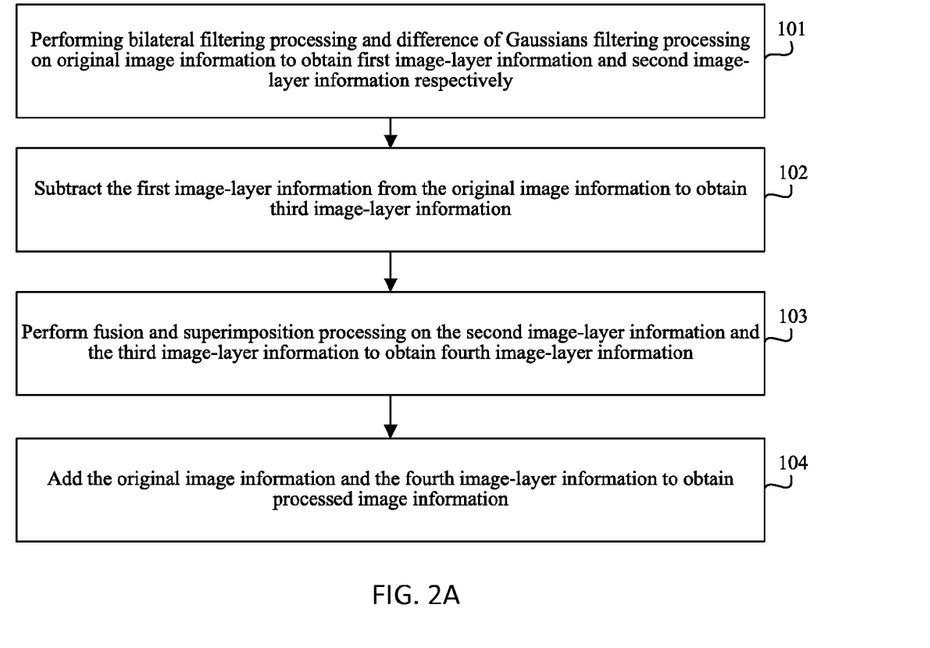
FIG. 2A is a flow chart of an image sharpening method according to an embodiment of the present invention.

FIG. 2A is a flow chart of an image sharpening method according to an embodiment of the present invention. As shown in FIG. 2A, the method in this embodiment includes:

Step 101: Performing bilateral filtering (Bilateral filter) processing and difference of Gaussians filtering processing on original image information to obtain first image-layer information and second image-layer information respectively.

An executor in this embodiment may be an image sharpening device, and may specifically be various devices that have an image processing capability, such as a server, a personal computer, and a large computer. In this embodiment, the original image information may be a luminance component in an input image, may also be chrominance information in an input image, and may also include both a luminance component and a chrominance component in an input image. Because human eyes are more sensitive to luminance than to chrominance, when image sharpening is performed, a luminance component in an input image is mainly processed. Therefore, the original image information in this embodiment mostly refers to a luminance component in an input image. The input image refers to an image input into an image sharpening device, and by taking a current moment as reference, the input image includes a currently input pixel value and a neighboring pixel value of the currently input pixel value. A range of the neighboring domain is determined according to an actual application, for example, the range of the neighboring domain may be a range formed by pixels that are input within one minute, and may also be a range formed by pixels that are input within three minutes.

Based on the foregoing, before step 101, the method may include an optional step of: obtaining luminance information of an input image and using the luminance information as the original image information.

Figure 2B:
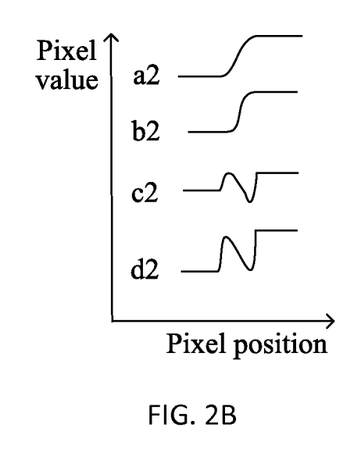
FIG. 2B is a schematic diagram of one-dimensional section curves of high-frequency information in an image sharpening process according to an embodiment of the present invention.

In this embodiment, in one aspect, the image sharpening device performs bilateral filtering processing on the original image information to obtain the first image-layer information. The bilateral filtering processing may be implemented through a bilateral filter, and the bilateral filter is a low-pass filter. The bilateral filter is an image smoothing filter widely used for removing a noise. However, being different from other mean filters, the bilateral filter may, while removing a texture detail (mainly referring to a minute edge outline) of an original image (referring to an image formed by the original image information), protect a black-white transition edge (mainly referring to an edge outline with an obvious black-white transition) in the original image. However, the black-white transition edge may be enhanced, which means that a white position is whiter and a black position is blacker. That is to say, the obtained first image-layer information does not include high-frequency information, which is corresponding to the texture detail in the original image, in the original image information, but includes high-frequency information, which is corresponding to the black-white transition edge in the original image, in the original image information. Moreover, a value of the high-frequency information, which is corresponding to the black-white transition edge in the original image, in the first image-layer information becomes larger. The bilateral filter can achieve an effect of smoothing an image because the bilateral filter is formed by two functions. One function refers to a filter coefficient decided by a geometric spatial distance, and the other function refers to a filter coefficient decided by a pixel difference. As shown in FIG. 2B, a curve a2 shows a one-dimensional gray-scale section of a black-white edge in the original image, and after bilateral filtering processing is performed on the original image information, a gray scale of the image edge changes more rapidly, and its one-dimensional gray-scale section is shown as a curve b2.

In this embodiment, in another aspect, the image sharpening device further performs difference of Gaussians filtering processing on the original image information to obtain the second image-layer information. The difference of Gaussians filtering processing may be implemented through a difference of Gaussians filter. The difference of Gaussians filter has two filter parameters, which are $\sigma 1$ and $\sigma 2$ respectively, where $\sigma 1 < \sigma 2$. A result of difference of Gaussians filtering is equivalent to a difference between two Gaussian filtering results, which is similar to a bandpass filter. By adjusting the two filter parameters of the difference of Gaussians filter, required image information of different frequency ranges may be obtained. The larger the filter parameter $\sigma 1$ is, the smaller a high-frequency noise in the second image-layer information that is obtained through difference of Gaussians filtering is. Because some texture details in the original image also belong to high-frequency information, if a selected value of the filter parameter σ1 is too large, it is possibly that the second image-layer information obtained by performing difference of Gaussians filtering cannot include information corresponding to the texture details of the original image. Meanwhile, the larger a ratio of the filter parameter σ2 to the filter parameter σ1 is, the more serious a halo effect of a finally obtained image is. Based on this, a proportional relationship between the filter parameter σ2 and the filter parameter σ1 should be appropriately selected. It can be seen that a ratio of the two filter parameters may be adjusted to implement a balance between texture detail information and high-frequency noise information in the second image-layer information that is obtained through difference of Gaussians filtering processing. Through a large number of experiments, it indicates that when the ratio of the filter parameter σ2 to the filter parameter σ1 is fixed around 2, it is helpful to improve a final sharpening effect. However, according to different original image information and required image sharpening effects, the ratio of the filter parameter σ2 to the filter parameter σ1 may be adjusted adaptively.

In the second image-layer information that is obtained through difference of Gaussians filtering, a one-dimensional gray-scale section at an image edge is similar to the curve c1 in FIG. 1.

Step 102: Subtract the first image-layer information from the original image information to obtain third image-layer information.

After the first image-layer information is obtained by performing bilateral filtering processing on the original image information, the image sharpening device subtracts the first image-layer information from the original image information to obtain the third image-layer information. The third image-layer information includes high-frequency information, which is corresponding to the texture detail in the original image, in the original image information. In addition, because a value of the high-frequency information, which is corresponding to the black-white transition edge in the original image, in the first image-layer information is different, the third image-layer information may also include high-frequency information that is corresponding to a black-white transition edge, where the high-frequency information that is corresponding to the black-white transition edge is obtained by subtracting the high-frequency information that is corresponding to the black-white transition edge in the first image-layer information from the high-frequency information that is corresponding to the black-white transition edge in the original image information. A one-dimensional gray-scale section of a corresponding black-white transition edge in the third image-layer information is shown as a curve c2 in FIG. 2B. It can be seen from a comparison between the curve c2 in FIG. 2B and the curve c1 in FIG. 1 that, in the third image-layer information, a one-dimensional gray-scale section of information extracted at the black-white transition edge in the image is different from the curve c1 in FIG. 1.

Step 103: Perform fusion and superimposition processing on the second image-layer information and the third image-layer information to obtain fourth image-layer information.

After the second image-layer information and the third image-layer information are obtained, the image sharpening device fuses and superimposes the two pieces of image-layer information, and in this way, an ideal detailed image-layer with a mild halo effect and a small noise may be obtained.

An optional implementation manner of step 103 includes:

Step 1031: Determine a pixel position at a black-white boundary in the original image information according to pixel values of a corresponding pixel position in the third image-layer information, the original image information, and the second image-layer information.

The pixel position at the black-white boundary mainly refers to a high-contrast edge area, at which a halo effect easily occurs, in the original image, that is, an area with an obvious gray-scale change, for example, is similar to an edge area at a black-white boundary. Because a one-dimensional gray-scale section of an image edge in the second image-layer information is opposite to that in the third image-layer information, this information may be used to locate the pixel position at the black-white boundary in the original image.

An optional implementation manner of step 1031 is: comparing pixel values of a corresponding pixel position in the third image-layer information, the original image information, and the second image-layer information, and if the pixel values of the corresponding pixel position in the third image-layer information, the original image information, and the second image-layer information progressively increase, using a pixel position that is corresponding to the progressively increasing pixel values as the pixel position at the black-white boundary in the original image information. That is to say, if pixel values of a certain pixel position satisfy formula (1), the pixel position is determined as a pixel position at a black-white boundary.

$$Y\_bilateral > Y\_original > Y\_DOG \qquad (1)$$

Y_bilateral, Y_original, and Y_DOG are pixel values (for a luminance component, the pixel values are gray-scale values) of a certain pixel position in the third image-layer information, the original image information, and the second image-layer information respectively.

Another optional implementation manner of step 1031 is: comparing pixel values of a corresponding pixel position in the third image-layer information, the original image information, and the second image-layer information, and if the pixel values of the corresponding pixel position in the third image-layer information, the original image information, and the second image-layer information progressively decrease, using a pixel position that is corresponding to the progressively decreasing pixel values as the pixel position at the black-white boundary in the original image information. That is to say, if pixel values of a certain pixel position satisfy formula (2), the pixel position is determined as a pixel position at a black-white boundary.

$$Y\_bilateral < Y\_original < Y\_DOG \qquad (2)$$

Step 1032: Multiply a pixel value that is corresponding to a pixel position at a black-white boundary in the third image-layer information by a first preset weight coefficient to obtain third processed image-layer information, multiply a pixel value that is corresponding to a pixel position at a black-white boundary in the second image-layer information by a second preset weight coefficient to obtain second processed image-layer information, and add the third processed image-layer information and the second processed image-layer information to obtain the fourth image-layer information.

After pixel positions at the black-white boundary are obtained, the image sharpening device performs special processing on these pixel positions at the black-white boundary, so as to alleviate or even eliminate a halo effect that occurs at pixel positions at a black-white boundary in a sharpened image. Specifically, the image sharpening device multiplies the pixel value that is corresponding to the pixel position at the black-white boundary in the third image-layer information by the first preset weight coefficient to obtain the third processed image-layer information, and multiplies the pixel value that is corresponding to the pixel position at the black-white boundary in the second image-layer information by the second preset weight coefficient to obtain the second processed image-layer information. The first weight coefficient and the second weight coefficient are preset, but are related to an image sharpening effect. If the first weight coefficient is larger, much high-frequency information, such as a texture detail, exists in an image sharpening result, and a noise is increased. If the second weight coefficient is larger, less high-frequency information, such as a texture detail, exists in the image sharpening result. A better image sharpening effect may be achieved by appropriately setting the first weight coefficient and the second weight coefficient. Preferably, the first weight coefficient and the second weight coefficient may be set to 1.5 and 1.8 respectively, which is not limited herein.

After the third processed image-layer information and the second processed image-layer information are obtained, the image sharpening device adds the third processed image-layer information and the second processed image-layer information to obtain the fourth image-layer information. In this process, because pixel values that are corresponding to a pixel position at a black-white boundary in the second processed image-layer information and the third processed image-layer information are multiplied by different weight coefficients, pixel values that are corresponding to these pixel positions at a black-white boundary in the fourth image-layer information may be optimally adjusted, so that contrast between the pixel values that are corresponding to these pixel positions at the black-white boundary has an ideal value.

Step 104: Add the original image information and the fourth image-layer information to obtain processed image information.

In view of a frequency domain, an image is blurred essentially because its high-frequency component is attenuated. Therefore, high-frequency information may be extracted and superimposed on the original image information to make the image clear.

In this embodiment, the fourth image-layer information obtained through operations in step 101 to step 103 mainly includes high-frequency information in the original image information, and furthermore a halo effect caused by the high-frequency information is alleviated or eliminated. Based on this, the image sharpening device adds the original image information and the fourth image-layer information, that is, superimposes the high-frequency information, which is extracted from the original image information and is processed, on the original image information, so as to obtain the processed image information. An image displayed by using the processed image information is clearer, and a halo effect caused by image sharpening is reduced, thereby improving an image sharpening effect.

Further, in the prior art, a Laplacian is used to process original image information, and the Laplacian is equivalent to a high-pass filter. Therefore, when high-frequency information, such as an edge and an outline in an original image, is extracted, a part of noises also acting as high-frequency information in the image are unavoidably extracted. After an image processed by using the Laplacian is superimposed on the original image, the noises are amplified, which seriously influences a subjective feeling of a person. However, in the image sharpening method provided in this embodiment, difference of Gaussians filtering is adopted, and the difference of Gaussians filtering refers to a difference between Gaussian filtering with two different filter parameters, and belongs to a bandpass filter. By flexibly controlling the two filter parameters, a noise in an image after the difference of Gaussians filtering may be well suppressed.

It can be seen from the foregoing that in this embodiment, bilateral filtering and difference of Gaussians filtering are well combined to sharpen an image, which not only may alleviate or even eliminate a halo effect at a high-contrast edge in the image, but also may suppress a noise in a finally sharpened image, thereby achieving a better image sharpening effect.

Figure 3:
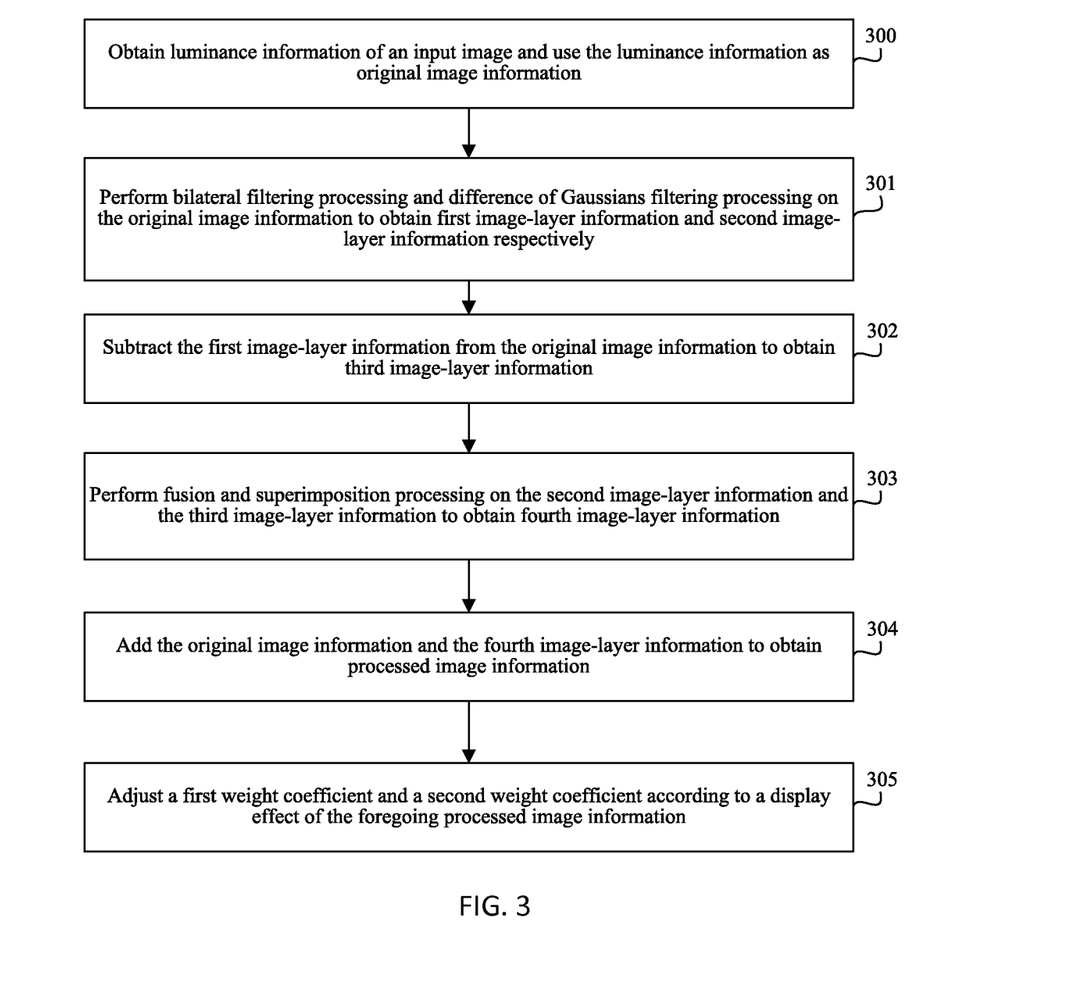
FIG. 3 is a flow chart of an image sharpening method according to another embodiment of the present invention.

FIG. 3 is a flow chart of an image sharpening method according to another embodiment of the present invention. As shown in FIG. 3, the method in this embodiment includes:

Step 300: Obtain luminance information of an input image and use the luminance information as original image information.

An executor in this embodiment may be an image sharpening device, and may specifically be various devices that have an image processing capability, such as a server, a personal computer, and a large computer. The input image refers to an image input into an image sharpening device, and by taking a current moment as reference, the input image includes a currently input pixel value and a neighboring pixel value of the currently input pixel value. A range of the neighboring domain is determined according to an actual application, for example, the range of the neighboring domain may be a range formed by pixels that are input within one minute, and may also be a range formed by pixels that are input within three minutes.

Because human eyes are more sensitive to luminance than to chrominance, when image sharpening is performed, a luminance component in an input image is mainly processed. Therefore, the original image information in this embodiment mostly refers to a luminance component in an input image. Specifically, the image sharpening device needs to first obtain the luminance component from the input image and use the luminance component as the original image information. An operation of obtaining the luminance component may be implemented by using any one method for extracting a luminance component in the prior art, which is not described herein again.

Step 300 is an optional step.

Step 301: Perform bilateral filtering processing and difference of Gaussians filtering processing on the original image information to obtain first image-layer information and second image-layer information respectively.

Step 302: Subtract the first image-layer information from the original image information to obtain third image-layer information.

Step 303: Perform fusion and superimposition processing on the second image-layer information and the third image-layer information to obtain fourth image-layer information.

Step 304: Add the original image information and the fourth image-layer information to obtain processed image information.

For step 301 to step 304, reference may be made to the description of step 101 to step 104 in FIG. 2A, which are not described herein again.

Step 305: Adjust a first weight coefficient and a second weight coefficient according to a display effect of the foregoing processed image information.

Values of the first weight coefficient and the second weight coefficient are related to an image sharpening effect. If the first weight coefficient is larger, much high-frequency information exists in an image sharpening result, and a noise is increased. If the second weight coefficient is larger, less high-frequency information exists in the image sharpening result, and meanwhile, a "halo" phenomenon becomes more serious.

To make the values of the first weight coefficient and the second weight coefficient more reasonable, and to further improve an effect of subsequent image sharpening, in this embodiment, after the processed image information is obtained, an image may be displayed according to the processed image information, and then the first weight coefficient and the second weight coefficient are adjusted according to a display effect of the processed image information.

Specifically, if the display effect of the processed image information is that a "halo" is obvious and high-frequency information, such as a texture detail, is not clear enough, the first weight coefficient is increased, and the second weight coefficient is reduced. The halo is obvious, which mainly means that a black-white boundary in an image is not clear, for example, a white line appears on a black margin, or a black line appears on a white margin.

If the display effect of the processed image information is that a noise is seriously amplified, the first weight coefficient is reduced, and the second weight coefficient is increased. The noise is seriously amplified, which mainly means that unnecessary information appears in an image.

It can be seen that in this embodiment, a first weight coefficient and a second weight coefficient are adjusted according to an image sharpening effect, and in a subsequent image sharpening process, the adjusted first weight coefficient and second weight coefficient are used to process a pixel value of a pixel position at a black-white boundary, so that a final image sharpening effect becomes better and an displayed image better conforms to a subjective feeling of a person.

It is noted herein that windows of filters used for performing bilateral filtering and difference of Gaussians filtering may be, but are not limited to, in a size of 5×5, which is within an acceptable range in terms of resource usage and algorithm complexity and provides a good image sharpening effect. In addition, if the windows of the two filters are enlarged, for example, to a size of 17×17 or an even larger size, the image sharpening effect is ensured, and meanwhile, an image contrast effect is also enhanced, so that a dark scene in the image is darkened, and a bright scene in the image is brightened, which is an image characteristic favored by human eyes, thereby improving an overall feeling of a definition and contrast of the image.

Figure 4:
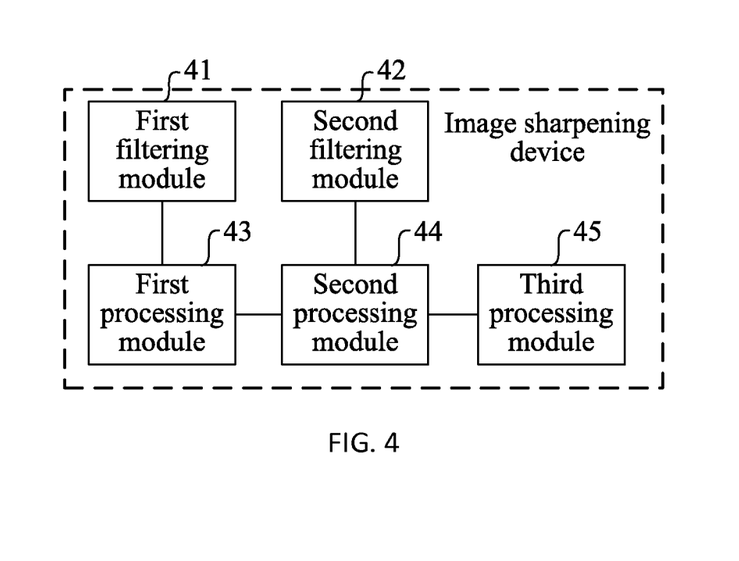
FIG. 4 is a schematic structural diagram of an image sharpening device according to an embodiment of the present invention.

FIG. 4 is a schematic structural diagram of an image sharpening device according to an embodiment of the present invention. As shown in FIG. 4, the device in this embodiment includes: a first filtering module 41, a second filtering module 42, a first processing module 43, a second processing module 44, and a third processing module 45.

The first filtering module 41 is configured to perform bilateral filtering processing on original image information to obtain first image-layer information. The second filtering module 42 is configured to perform difference of Gaussians filtering processing on the original image information to obtain second image-layer information. The first processing module 43 is connected to the first filtering module 41 and is configured to subtract the first image-layer information obtained by the first filtering module 41 from the original image information to obtain third image-layer information. The second processing module 44 is connected to the second filtering module 42 and the first processing module 43, and is configured to perform fusion and superimposition processing on the second image-layer information obtained by the second filtering module 42 and the third image-layer information obtained by the first processing module 43 to obtain fourth image-layer information. The third processing module 45 is connected to the second processing module 44 and is configured to add the original image information and the fourth image-layer information obtained by the second processing module 44 to obtain processed image information.

The image sharpening device provided in this embodiment may be various devices that have an image processing capability, such as a server, a personal computer, and a large computer.

Function modules of the image sharpening device provided in this embodiment may be configured to execute a procedure of the image sharpening method shown in FIG. 2A, their specific working principle is not described herein again, and for details, reference is made to the description of the method embodiment.

With the image sharpening device provided in this embodiment, bilateral filtering processing is performed on original image information, and first image-layer information obtained through bilateral filtering processing is subtracted from the original image information to obtain third image-layer information. In addition, difference of Gaussians filtering processing is performed on the original image information to obtain second image-layer information. By using different manifestations of the third image-layer information and the second image-layer information at a position of a high-contrast edge, the third image-layer information and the second image-layer information are fused and superimposed. Then, fourth image-layer information obtained through the fusion and superimposition and the original image information are added to obtain processed image information. Therefore, image sharpening is implemented, characteristics of bilateral filtering and difference of Gaussians filtering are fully utilized, and beneficial effects of the two are well combined, thereby alleviating or even eliminating a halo effect caused by image sharpening, and improving an image sharpening effect.

In addition, the image sharpening device in this embodiment adopts the difference of Gaussians filtering. The difference of Gaussians filtering refers to a difference between Gaussian filtering with two different filter parameters, and belongs to a bandpass filter. By flexibly controlling the two filter parameters, a noise in image information after the difference of Gaussians filtering may be well suppressed.

Figure 5:
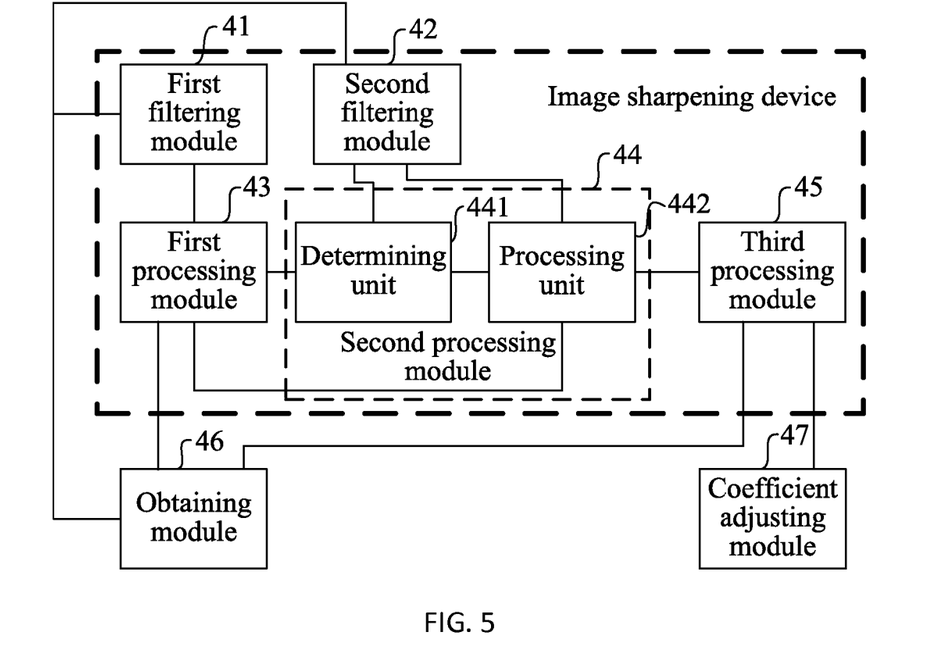
FIG. 5 is a schematic structural diagram of an image sharpening device according to another embodiment of the present invention.

FIG. 5 is a schematic structural diagram of an image sharpening device according to another embodiment of the present invention. This embodiment is implemented based on the embodiment shown in FIG. 4. As shown in FIG. 5, in addition to a first filtering module 41, a second filtering module 42, a first processing module 43, a second processing module 44, and a third processing module 45, the device in this embodiment further includes: an obtaining module 46.

The obtaining module 46 is configured to obtain luminance information of an input image and use the luminance information as original image information. Optionally, the obtaining module 46 is connected to the first filtering module 41, the second filtering module 42, the first processing module 43, and the third processing module 45, and is configured to provide the original image information for the first filtering module 41, the second filtering module 42, the first processing module 43, and the third processing module 45.

Further, the second processing module 44 in this embodiment includes: a determining unit 441 and a processing unit 442.

The determining unit 441 is connected to the second filtering module 42 and the first processing module 43, and is configured to determine a pixel position at a black-white boundary in the original image information according to pixel values of a corresponding pixel position in the third image-layer information obtained by the first processing module 43, the original image information, and the second image-layer information obtained by the second filtering module 42.

The processing unit 442 is connected to the determining unit 441, the second filtering module 42, and the first processing module 43, and is configured to multiply a pixel value that is corresponding to the pixel position at the black-white boundary in the third image-layer information obtained by the first processing module 43 by a first preset weight coefficient to obtain third processed image-layer information, where the pixel position at the black-white boundary is determined by the determining unit 441; multiply a pixel value that is corresponding to the pixel position at the black-white boundary in the second image-layer information obtained by the second filtering module 42 by a second preset weight coefficient to obtain second processed image-layer information, where the pixel position at the black-white boundary is determined by the determining unit 441; and add the third processed image-layer information and the second processed image-layer information to obtain fourth image-layer information. The processing unit 442 is also connected to the third processing module 45 and provides the fourth image-layer information for the third processing module 45.

Preferably, the determining unit 441 may specifically be configured to compare the pixel values of the corresponding pixel position in the third image-layer information, the original image information, and the second image-layer information, and if the pixel values of the corresponding pixel position in the third image-layer information, the original image information, and the second image-layer information progressively increase or progressively decrease, use a pixel position that is corresponding to the progressively increasing or progressively decreasing pixel values as the pixel position at the black-white boundary in the original image information.

Further, the image sharpening device in this embodiment further includes: a coefficient adjusting module 47.

The coefficient adjusting module 47 is connected to the third processing module 45 and is configured to adjust the first weight coefficient and the second weight coefficient according to a display effect of the processed image information obtained by the third processing module 45.

Optionally, the coefficient adjusting module 47 may specifically be configured to, if the display effect of the processed image information is that a "halo" phenomenon is serious and high-frequency information, such as a texture detail, is not clear enough, increase the first weight coefficient and reduce the second weight coefficient; and if the display effect of the processed image information is that a noise is seriously amplified, reduce the first weight coefficient and increase the second weight coefficient.

The foregoing function modules or units of the image sharpening device provided in this embodiment may be configured to execute a corresponding procedure in the foregoing image sharpening method embodiment, their specific working principle is not described herein again, and for details, reference is made to the description of the method embodiment.

With the image sharpening device in this embodiment, bilateral filtering and difference of Gaussians filtering are well combined to sharpen an image, which not only may alleviate or even eliminate a halo effect at a high-contrast edge in the image, but also may suppress a noise in a finally sharpened image, thereby achieving a better image sharpening effect. In addition, with the image sharpening device in this embodiment, a first weight coefficient and a second weight coefficient are adjusted according to a display effect of processed image information, and in a subsequent image sharpening process, the adjusted first weight coefficient and second weight coefficient are used to process a pixel value of a pixel position at a black-white boundary, so that a final image sharpening effect becomes better and an displayed image better conforms to a subjective feeling of a person.

Persons of ordinary skill in the art may understand that all or a part of the steps of the foregoing method embodiments may be implemented by a program instructing relevant hardware. The foregoing program may be stored in a computer readable storage medium. When the program is run, the steps of the foregoing method embodiments are performed. The foregoing storage medium includes any medium that is capable of storing program codes, such as a ROM, a RAM, a magnetic disk, or an optical disk.

Finally, it should be noted that the foregoing embodiments are merely intended for describing the technical solutions of the present invention, rather than limiting the present invention. Although the present invention is described in detail with reference to the foregoing embodiments, persons of ordinary skill in the art should understand that they may still make modifications to the technical solutions described in the foregoing embodiments, or make equivalent replacements to some or all the technical features of the technical solutions, as long as these modifications or replacements do not cause the essence of corresponding technical solutions to depart from the scope of the technical solutions in the embodiments of the present invention.

What is claimed is:

1. An image sharpening method performed on a computer system, the method comprising:
    performing bilateral filtering processing and difference of Gaussians filtering processing on original image information to obtain first image-layer information and second image-layer information, respectively;
    subtracting the first image-layer information from the original image information to obtain third image-layer information;
    performing fusion and superimposition processing on the second image-layer information and the third image-layer information to obtain fourth image-layer information; and
    adding the original image information and the fourth image-layer information to obtain processed image information.

2. The method according to claim 1, wherein before performing the bilateral filtering processing and difference of Gaussians filtering processing, the method comprises:
    obtaining luminance information of an input image and using the luminance information as the original image information.

3. The method according to claim 1, wherein performing fusion and superimposition processing comprises:
    determining a high-contrast pixel position in the original image information according to pixel values of a corresponding pixel position in the third image-layer information, the original image information, and the second image-layer information;
    multiplying a pixel value that corresponds to a pixel position at a black-white boundary in the third image-layer information by a first preset weight coefficient to obtain third processed image-layer information;
    multiplying a pixel value that corresponds to a pixel position at a black-white boundary in the second image-layer information by a second preset weight coefficient to obtain second processed image-layer information; and adding the third processed image-layer information and the second processed image-layer information to obtain the fourth image-layer information.

4. The method according to claim 3, wherein determining the high-contrast pixel position in the original image information comprises:
   comparing the pixel values of the corresponding pixel position in the third image-layer information, the original image information, and the second image-layer information; and
   if the pixel values of the corresponding pixel position in the third image-layer information, the original image information, and the second image-layer information progressively increase or progressively decrease, using a pixel position that corresponds to the progressively increasing or progressively decreasing pixel values as the pixel position at the black-white boundary in the original image information.

5. The method according to claim 3, wherein after the adding original image information and the fourth image-layer information, the method further comprises:
   adjusting the first weight coefficient and the second weight coefficient according to a display effect of the processed image information.

6. An image sharpening device, comprising:
   means for performing bilateral filtering processing on an original image information to obtain first image-layer information;
   means for performing difference of Gaussians filtering processing on the original image information to obtain second image-layer information;
   means for subtracting the first image-layer information from the original image information to obtain third image-layer information;
   means for performing fusion and superimposition processing on the second image-layer information and the third image-layer information to obtain fourth image-layer information; and
   means for adding the original image information and the fourth image-layer information to obtain processed image information.

7. The image sharpening device according to claim 6, further comprising means for obtaining luminance information of an input image and use the luminance information as the original image information.

8. The image sharpening device according to claim 6, wherein the means for performing fusion and superimposition processing comprises:
   means for determining a pixel position at a black-white boundary in the original image information according to pixel values of a corresponding pixel position in the third image-layer information, the original image information, and the second image-layer information; and
   means for multiplying a pixel value that is corresponding to a pixel position at a black-white boundary in the third image-layer information by a first preset weight coefficient to obtain third processed image-layer information, multiplying a pixel value that is corresponding to a pixel position at a black-white boundary in the second image-layer information by a second preset weight coefficient to obtain second processed image-layer information, and adding the third processed image-layer information and the second processed image-layer information to obtain the fourth image-layer information.

9. The image sharpening device according to claim 8, wherein the means for determining a pixel condition comprises means for comparing the pixel values of the corresponding pixel position in the third image-layer information, the original image information, and the second image-layer information, and if the pixel values of the corresponding pixel position in the third image-layer information, the original image information, and the second image-layer information progressively increase or progressively decrease, using a pixel position that corresponds to the progressively increasing or progressively decreasing pixel values as the pixel position at the black-white boundary in the original image information.

10. The image sharpening device according to claim 8, further comprising means for adjusting the first weight coefficient and the second weight coefficient according to a display effect of the processed image information.

11. A non-transitory computer-readable storage medium having instructions stored thereon for processing data information, such that the instructions, when executed by at least one processing device, cause the at least one processing device to perform the operations of:
   performing bilateral filtering processing on original image information to obtain first image-layer information;
   performing difference of Gaussians filtering processing on the original image information to obtain second image-layer information;
   subtracting the first image-layer information from the original image information to obtain third image-layer information;
   performing fusion and superimposition processing on the second image-layer information and the third image-layer information to obtain fourth image-layer information; and
   adding the original image information and the fourth image-layer information to obtain processed image information.

12. The non-transitory computer-readable storage medium according to claim 11, wherein the operations further comprise obtaining luminance information of an input image and use the luminance information as the original image information.

13. The non-transitory computer-readable storage medium according to claim 11, wherein performing the fusion and superimposition processing comprises:
   determining a pixel position at a black-white boundary in the original image information according to pixel values of a corresponding pixel position in the third image-layer information, the original image information, and the second image-layer information; and
   multiplying a pixel value that is corresponding to a pixel position at a black-white boundary in the third image-layer information by a first preset weight coefficient to obtain third processed image-layer information;
   multiplying a pixel value that is corresponding to a pixel position at a black-white boundary in the second image-layer information by a second preset weight coefficient to obtain second processed image-layer information; and
   adding the third processed image-layer information and the second processed image-layer information to obtain the fourth image-layer information.

14. The non-transitory computer-readable storage medium according to claim 13, wherein determining the pixel position comprises comparing the pixel values of the corresponding pixel position in the third image-layer information, the original image information, and the second image-layer information, and if the pixel values of the corresponding pixel position in the third image-layer information, the original image information, and the second image-layer information progressively increase or progressively decrease, using a pixel position that is corresponding to the progressively increasing or progressively decreasing pixel values as the pixel position at the black-white boundary in the original image information.

15. The non-transitory computer-readable storage medium according to claim 13, wherein the operations further comprise adjusting the first weight coefficient and the second weight coefficient according to a display effect of the processed image information.

* * * * *